United States Patent
Liu

[11] Patent Number: 5,988,337
[45] Date of Patent: Nov. 23, 1999

[54] RATCHET TOOL

[76] Inventor: Kuo-Hunn Liu, No.4 Alley 9, La. 296, Peng Yird Rd., Tia Ping, Taichung Hsien, Taiwan

[21] Appl. No.: 09/201,714

[22] Filed: Dec. 1, 1998

[51] Int. Cl.⁶ .............................. B25B 15/04; F16D 41/18
[52] U.S. Cl. ............................................ 192/43.1; 81/63.1
[58] Field of Search .................... 192/43, 43.1, 43.2, 192/46, 47, 71; 81/58.4, 63.1

[56] References Cited

U.S. PATENT DOCUMENTS

| | | | |
|---|---|---|---|
| 2,201,827 | 5/1940 | Froeschl et al. | 192/43.2 |
| 4,685,204 | 8/1987 | Braun | 81/63.1 |
| 5,570,616 | 11/1996 | Thompson et al. | 81/63.1 |
| 5,573,093 | 11/1996 | Lee | 192/43.2 |
| 5,687,820 | 11/1997 | Lin | 192/43.2 |

*Primary Examiner*—Richard M. Lorence
*Attorney, Agent, or Firm*—Rosenberg, Klein & Lee

[57] ABSTRACT

A ratchet tool includes a handle with a shaft extending therefrom onto which a base member, a plate and an adjusting member are respectively mounted. The base member has two pawl members biasedly received in the first end thereof so as to engage with the elongated grooves in the shaft and each of the pawl members has a bar engaged therewith wherein the bars are pivotally connected to the base member. The plate fixedly connected to the base member has three positioning dents and the adjusting member has a rod extending therefrom which is located between the two bars, a ball is received in one of the three positioning dents and biased by a spring received in the adjusting member. When rotating the adjusting member, one of the bars is moved to remove the corresponding pawl member from the elongated groove so that the effective direction of the shaft to be rotated is decided by the operation of the adjusting member.

5 Claims, 4 Drawing Sheets

RATCHET TOOL

FIELD OF THE INVENTION

The present invention relates to a tool, and more particularly, to an improved ratchet tool having an adjusting member rotatably mounted to the shaft of the tool and the adjusting member actuates two pawl members so as to selectably engage one of the two pawl members with the elongated grooves defined in the shaft.

BACKGROUND OF THE INVENTION

A conventional ratchet tool generally has a toothed wheel rotatably received in the shank portion of the tool and a pawl member is engaged with the wheel. The shapes of the teeth of the wheel and the shape of the pawl member are designed to allow the wheel to be rotated in one direction and outputs a torque in the other direction. By this arrangement, the tool may outputs the torque without removing the tool from the object so that the user can reciprocatingly operate the tool to tighten or loose the object such as a bolt or a nut. However, the torque output is decided by the depth of the toothed wheel and the pawl member, that is to say, if the shapes of the tooth and the pawl member engaged with the tooth are not deep enough, the toothed wheel could roll over the pawl member if a larger toque is applied. In order to improve this inherent shortcoming, the size of the ratchet tool has to be increased and this results in a heavy weight and inconvenient for use. Furthermore, the ratchet tool generally exerts the torque transversely to the longitudinal axis of the tool, this could be inconvenient for the users who needs to rotate the bolt or the nut whose location shares a common axis with the tool.

The present invention intends to provide a ratchet tool which has an adjusting member mounted to the shaft of the tool and the effective direction of the tool can be decided by rotating the adjusting member.

The present invention has arisen to mitigate and/or obviate the disadvantage of the conventional ratchet tool.

SUMMARY OF THE INVENTION

In accordance with one aspect of the present invention, there is provided a ratchet tool comprising a base member having a central hole for a shaft extending therethrough which has a plurality of elongated grooves defined in the outside thereof and is fixedly connected to a handle. Two recesses are respectively defined in the first end thereof and communicate with the central hole. Two pawl members are respectively received in the two grooves and biased by two respective springs, each of the two pawl members having a tooth for engagement with the elongated grooves.

Two bars are respectively engaged with the two pawl members and pivotally engaged with the two holes defined in the first end of the base member so that the shaft is located between the two bars and the two pawl members. A plate is fixedly connected to the first end of the base member and mounted to the shaft and has three positioning dents respectively defined in the plate.

An adjusting member is mounted to the plate and has a rod extending therefrom which is located between the two bars. A ball is biasedly received between the adjusting member and one of the three positioning dents so that when rotating the adjusting member, one of the pawl members is disengaged from the elongated groove by one of the bars.

The main object of the present invention is to provide a ratchet tool which has a shaft extending longitudinally from the handle.

Another object of the present invention is to provide a ratchet tool which has an adjusting member mounted to the shaft so as to adjust the effective direction of the shaft to output a torque.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
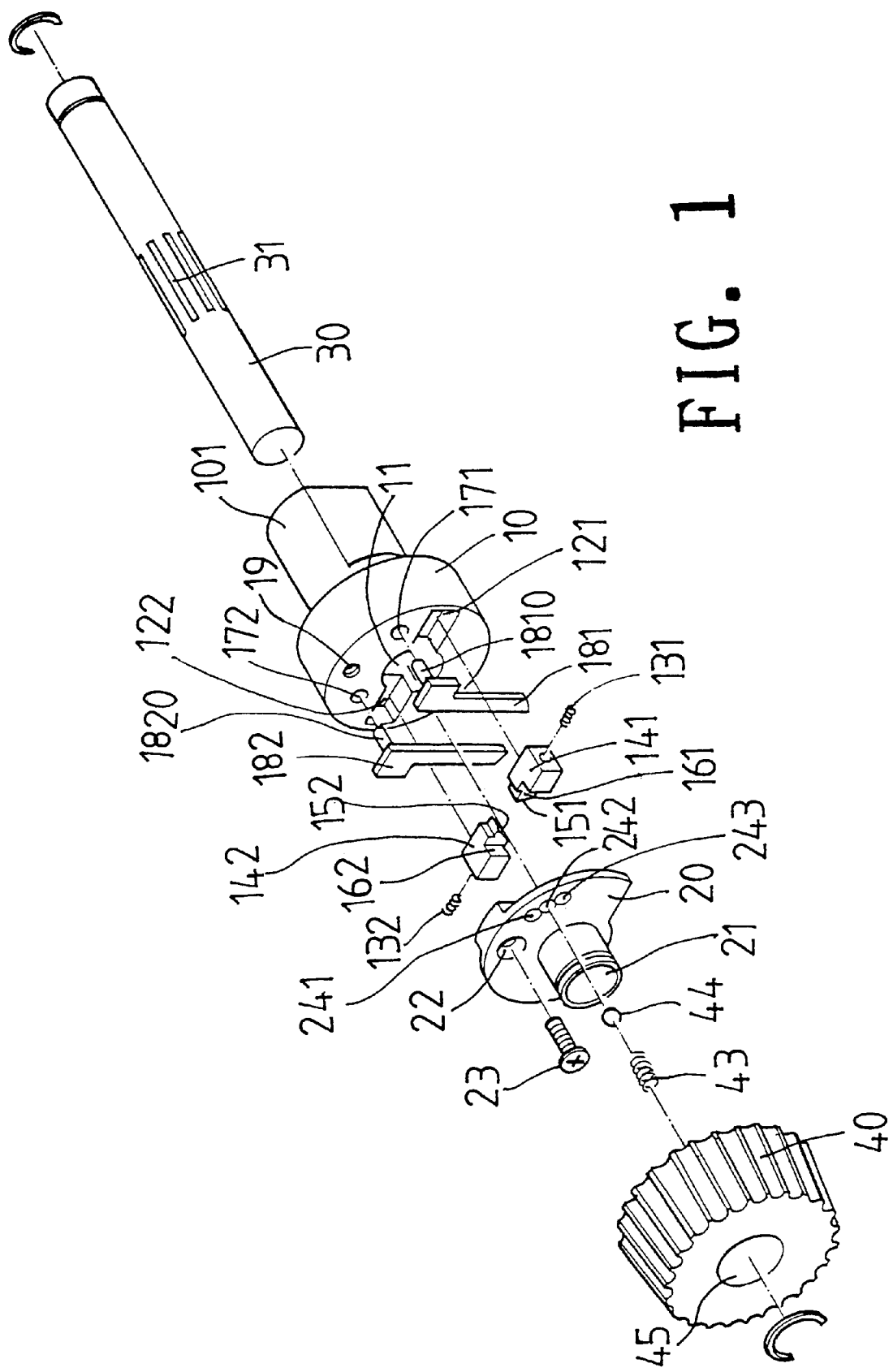
FIG. 1 is an exploded view of the ratchet tool in accordance with the present invention.
Figure 2:
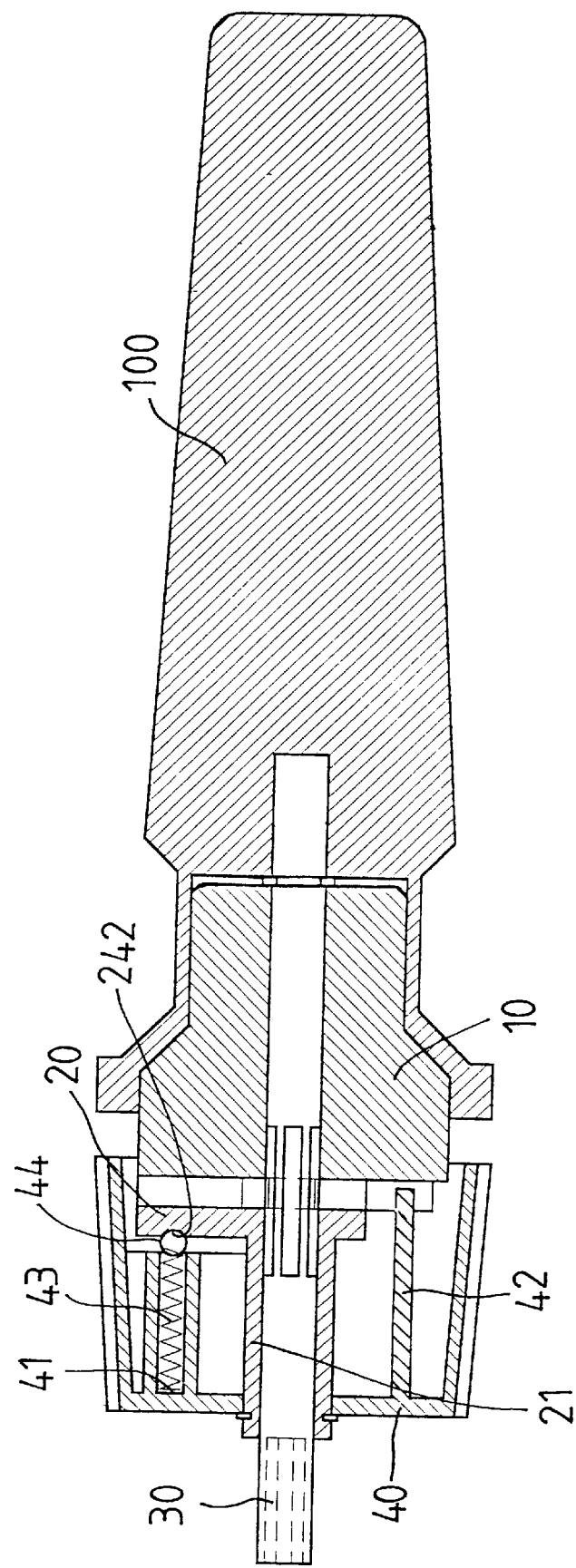
FIG. 2 is a side elevational view, partly in section, of the ratchet tool in accordance with the present invention.
Figure 3:
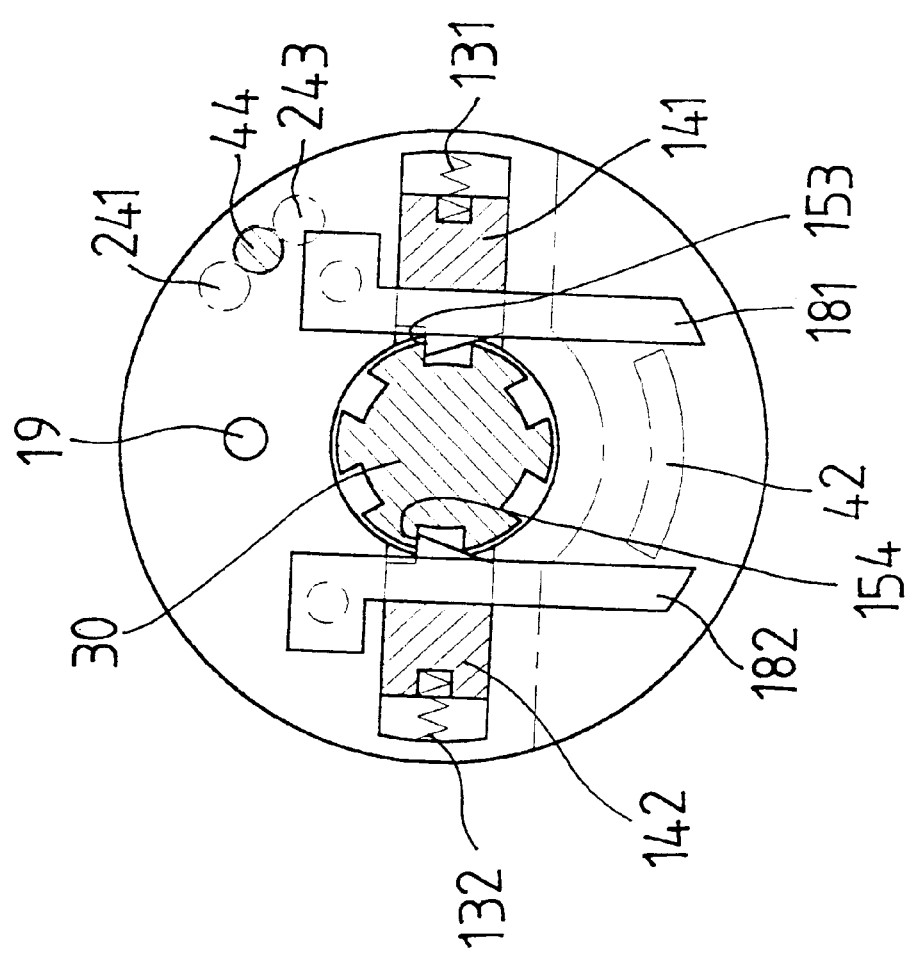
FIG. 3 is an illustrative view to show the mechanism of the ratchet tool when the adjusting member is not yet rotated.

Referring to FIGS. 1 to 3, ratchet tool comprising a base member 10 which has a central hole defined therethrough for a shaft 30 extending therethrough which has a plurality of elongated grooves 31 defined in the outside thereof and is fixedly connected to a handle 100. Two recesses 121, 122 are respectively defined in the first end thereof and communicate with the central hole 11, two holes 171, 172 and a threaded hole 19 are respectively defined in the first end of the base member 10 and are located above the two recesses 121, 122. A neck 101 extends from the second end of the base member 10 so that the handle 100 is connected to the neck 101.

Two pawl members 141, 142 are respectively received in the two grooves 121, 122 and biased by two respective springs 131, 132. Each of the two pawl members 141, 142 has a tooth 151/152 extending therefrom so as to engage with the elongated grooves 31. Each of the two pawl members 141, 142 has a concavity 161/162 defined therein. Two bars 181, 182 each have a pin 1810, 1820 extending laterally from one of two ends thereof so as to pivotally received in the two holes 171, 172, the two bars 181, 182 respectively engaged with the two concavities 161, 162 of the two pawl members 141, 142 so that the shaft 30 is located between the two bars 181, 182 and the two pawl members 141, 142.

A plate 20 has an aperture 22 defined therethrough and is fixedly connected to the first end of the base member 10 by extending a bolt 23 through the aperture 22 and threadedly engaged with the threaded hole 19. The plate 20 has a tube 21 extending therefrom so that the shaft 30 may extend through the tube 21, and three positioning dents 241, 242, 243 respectively defined in the plate 20.

An adjusting member 40 has a hole 45 so as to be mounted to the tube 21 of the plate 20 and has a rod 42 extending therefrom which is located between the two bars 181, 182. The adjusting member 40 has a tubular member 41 which has a spring 43 received therein so as to bias a ball 44 which is biasedly received between the adjusting member 40 and one of the three positioning dents 241, 242, 243 so that the ball 44 can be moved in either one of the three positioning dents 241, 242, 243. It is to be noted that when the adjusting member 40 is not rotated, the ball 44 is received in the positioning dent 242 which is located in the mediated position of the three positioning dents 241, 242, 243.

Figure 4:
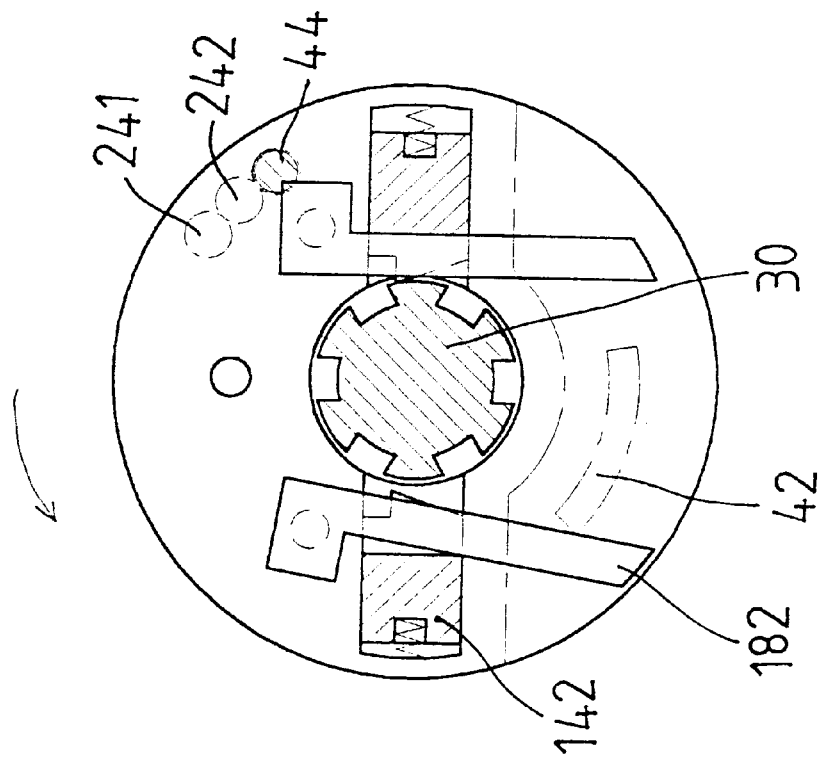
FIG. 4 is an illustrative view to show the mechanism of the ratchet tool when the adjusting member is rotated to the left.
Figure 5:
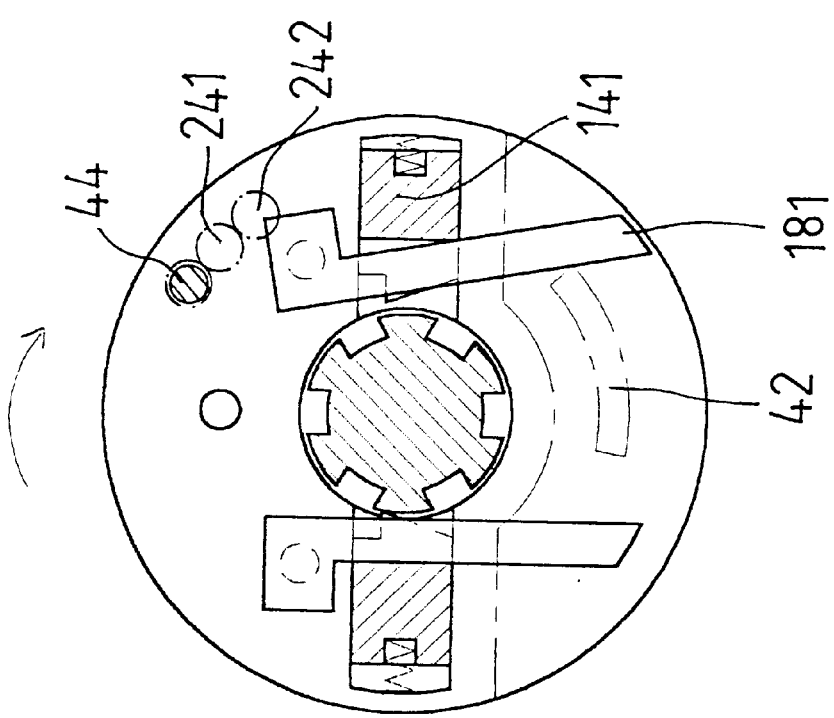
FIG. 5 is an illustrative view to show the mechanism of the ratchet tool when the adjusting member is rotated to the right.

Referring to FIG. 4, when rotating the adjusting member 40 to the left, the ball 44 is moved to be received in the positioning dent 243 and the pawl member 142 is disengaged from the elongated groove 31 by the bar 182 which is moved by the movement of the rod 42 so that the shaft 30 is allowed to be rotated counterclockwise freely and generates a torque when the shaft 30 is rotated clockwise. Referring to FIG. 5, when rotating the adjusting member 40 to the right, the ball 44 is moved to be received in the positioning dent 241 and the pawl member 141 is disengaged from the elongated groove 31 by the bar 181 which is moved by the movement of the rod 42 so that the shaft 30 is allowed to be rotated clockwise freely and generates a torque when the shaft 30 is rotated counter-clockwise.

The shaft 30 shares a common axis with the handle 100 and is easily adjusted by rotating the adjusting member 40. Furthermore, the depth of the elongated grooves 31 and the tooth 151/152 of each of the pawl members 141, 142 can be shaped to have enough depth so that the torque output can be increased.

While we have shown and described various embodiments in accordance with the present invention, it should be clear to those skilled in the art that further embodiments may be made without departing from the scope and spirit of the present invention.

What is claimed is:

1. A ratchet tool comprising:

a base member having a central hole defined therethrough for a shaft extending therethrough which has a plurality of elongated grooves defined in the outside thereof and is adapted to be fixedly connected to a handle, two recesses respectively defined in the first end thereof and communicating with said central hole, two holes respectively defined in the first end of said base member and located above said two recesses;

two pawl members respectively received in said two grooves and biased by two respective springs, each of said two pawl members having a tooth extending therefrom and a concavity defined therein, said tooth of each of said two pawl members engaged with one of said elongated grooves;

two bars respectively engaged with said two concavities of said two pawl members and pivotally engaged with said two holes so that said shaft is located between said two bars and said two pawl members;

a plate fixedly connected to the first end of said base member and mounted to said shaft, three positioning dents respectively defined in said plate, and an adjusting member mounted to said plate and having a rod extending therefrom which is located between said two bars and a ball biasedly received between said adjusting member and one of said three positioning dents so that when rotating the adjusting member, one of said pawl members is disengaged from said elongated groove by one of said bars.

2. The ratchet tool as claimed in claim 1, wherein said plate has an aperture defined therethrough and said first end of said base member has a threaded hole so that a bolt extends through said aperture and threadedly engaged with said threaded hole.

3. The ratchet tool as claimed in claim 1, wherein said plate has a tube extending therefrom through which shaft extends, said adjusting member rotatably mounted to said tube.

4. The ratchet tool as claimed in claim 1, wherein each of said bars has a pin extending laterally therefrom which is inserted into one of said two holes.

5. The ratchet tool as claimed in claim 1, wherein said adjusting member has a tubular member which has a spring received therein so as to bias said ball.

* * * * *